United States Patent [19]

Domesle et al.

[11] Patent Number: 5,073,532
[45] Date of Patent: Dec. 17, 1991

[54] CATALYST FOR PURIFYING EXHAUST GASES FROM INTERNAL COMBUSTION ENGINES AND METHOD OF MAKING THE CATALYST

[75] Inventors: Rainer Domesle, Maintal; Bernd Engler, Hanau; Edgar Koberstein, Alzenau; Peter Schubert, Hanau, all of Fed. Rep. of Germany

[73] Assignee: Degussa Aktiengesellschaft, Frankfurt am Main, Fed. Rep. of Germany

[21] Appl. No.: 559,095

[22] Filed: Jul. 30, 1990

Related U.S. Application Data

[63] Continuation of Ser. No. 303,287, Jan. 30, 1990, abandoned.

[30] Foreign Application Priority Data

Feb. 3, 1988 [DE] Fed. Rep. of Germany ....... 3803122

[51] Int. Cl.$^5$ .................. B01J 21/04; B01J 21/06; B01J 23/10; B01J 23/40
[52] U.S. Cl. ................. 502/304; 423/213.5
[58] Field of Search .......................... 502/304

[56] References Cited

U.S. PATENT DOCUMENTS

| | | | |
|---|---|---|---|
| 4,239,656 | 12/1980 | Fujitani et al. | 252/462 |
| 4,299,734 | 12/1981 | Fujitani et al. | 252/462 |
| 4,316,822 | 2/1982 | Fujitani et al. | 252/462 |
| 4,367,166 | 1/1983 | Fujitani et al. | 252/462 |
| 4,617,794 | 10/1986 | Fujitani et al. | 60/274 |
| 4,661,329 | 4/1987 | Suzuki et al. | 252/245 |
| 4,801,620 | 1/1989 | Fujitani et al. | 518/715 |
| 4,957,710 | 9/1990 | Nagai et al. | 422/171 |

FOREIGN PATENT DOCUMENTS 2907106 9/1980 Fed. Rep. of Germany .

Primary Examiner—W. J. Shine
Attorney, Agent, or Firm—Beveridge, DeGrandi & Weilacher

[57] ABSTRACT

A catalyst is described made of active aluminum oxide with additives of $CeO_2$, $ZrO_2$, and $Fe_2O_3$ and/or NiO as carrier and an active phase, applied thereon and consisting of platinum, palladium and/or rhodium, and a base metal, which is obtainable by impregnation of the additive-containing carrier with solutions of salts of the metals for the active phase, wherein the base metal of the active phase is cerium, by drying, and by heating to 250° to 650° C. The catalyst can be used for the oxidation and/or reduction of exhaust gases from internal combustion engines.

18 Claims, No Drawings

CATALYST FOR PURIFYING EXHAUST GASES FROM INTERNAL COMBUSTION ENGINES AND METHOD OF MAKING THE CATALYST

This application is a continuation of application Ser. No. 07/303,287, filed Jan. 30, 1990, now abandoned.

INTRODUCTION AND BACKGROUND

The present invention relates to a catalyst for purifying exhaust gases from internal combustion engines by oxidation and/or reduction. The catalysts can contain the platinum group metals platinum, palladium, or rhodium, separately or in combination, as is known in the art. Depending upon composition, catalysts of the invention can be used as an oxidation catalyst, as a reduction catalyst of a two-bed catalytic converter (here, the exhaust gas is first lead to a reduction catalyst and then after addition of air, to an oxidation catalyst) or as a multifunctional catalyst for the concurrent conversion of oxidizable and reducible components in the exhaust gas.

Against a background of fuel economy, modern engine designs predominantly have operation phases designed with an oxygen excess, so that catalysts with improved lean activity are increasingly required The lean activities of conventional catalysts frequently prove to be inadequate in the above mentioned engine designs For this reason, there was urgent need to remedy this deficiency.

The present invention proceeds from what is known in the teaching of West German patent (DS-PS) 29 07 106. This prior art describes exhaust gas purification catalysts, which contain platinum, rhodium, and nickel if necessary, as the active phase on a carrier made of $Al_2O_3$ of the transition series, the said carrier having been modified by addition of $CeO_2$, $Fe_2O_3$, and $ZrO_2$. The present invention expands this teaching relative to possible noble metals for active phases and the combinations thereof, and adds to the base metal components previously used therewith a new element that must be used. The present invention leads to the object of increasing lean stability and providing a type of catalyst that is universal for the oxidation and/or reduction of exhaust gases produced by internal combustion engines.

SUMMARY OF THE INVENTION

An object of the invention is to provide a catalyst for purifying exhaust gases produced by internal combustion engines with aluminum oxide from the transition series as the carrier, which contains 5 to 70 weight % $CeO_2$ and 1 to 20 weight % $ZrO_2$, 0 the 10 weight % $Fe_2O_3$ and 0 to 20 weight % NiO. As the catalytically active phase applied, to the carrier there is employed according to the invention 0.03 to 3 weight % platinum, palladium, and/or rhodium and a base metal. The weight ratio for platinum and/or palladium and the optionally present rhodium is in the range of 2:1 to 20:1.

The product of the invention is obtainable by impregnation of the optionally lattice stabilized carrier with an aqueous solution of cerium and zirconium salt and optionally iron salt and/or nickel salt or a combination of the optionally lattice-stabilized carrier with an aqueous suspension of the oxides, hydroxides, or carbonates thereof. Subsequently, tempering of the carrier is done by heating in air at 500 to 900° C. Impregnation of the carrier follows, with an aqueous solution of a salt of the noble metal and the base metal. This, in turn, is followed by a treatment in a hydrogen-containing gas stream at temperatures from 250 to 650° C., whereby the catalyst in a form of a coating on the carrier is present in an amount of 5 to 30 weight %, based on the weight of the carrier. The carrier body itself can be a honeycomb-shaped carrier of ceramic or metal.

The catalyst is characterized by the fact that the catalytically active phase applied by impregnation as described above contains cerium as the base metal, in addition to the noble metal, in a quantity of 0.01 to 150 weight %, based on the total weight of the noble metal that is present.

A feature of the invention therefore is to bring the element cerium, previously used in relatively high amounts only for doping the catalysis-promoting carrier material $Al_2O_3$ of the so-called transition series, e.g., gamma-aluminum oxide, into intimate interaction with the catalyst components, containing the platinum group metals, the so-called catalytically active phase. In so doing, even very small amounts of cerium prove to be effective in that they increase appreciably the catalyst activity, particularly during operating modes with excess oxygen. This increase in activity affects the hydrocarbon conversion, but primarily $NO_x$ conversion. At the same time, the hydrocarbon conversion in rich exhaust gases is raised by concurrent use of cerium in the noble metal component.

The doping of the carrier component with $CeO_2$, $ZrO_2$, and optionally $Fe_2O_3$ and/or NiO occurs primarily as taught in the prior art; see DE-PS 29 07 106. If palladium is used alone or in combination with one or more of the other platinum group metals, a water-soluble salt of the said metal is employed, for example, $Pd(NO_3)_2$ or $PdCl_2$.

It is a further feature of this invention that at least one of the platinum group metals, preferably all, together with cerium, are used for the impregnation in the form of a solution containing the salts of all elements A final hydrogen treatment of the still untempered preliminary stage of the active phase is recommended, particularly if rhodium is present.

The lattice of the carrier material, e.g., gamma-aluminum oxide and/or another crystalline phase from the transition region to an alpha-aluminum oxide, can be stabilized by impregnation with solutions of salts of alkaline-earth metals, of zirconium, and of elements in the rare-earth series and silicon-containing compounds and by subsequent heating for about 4 to 12 hours. Instead of impregnation, coprecipitation of aluminum salts and the preliminary stabilizer stage can be used.

Another object of the invention is the use of the noble catalyst for the purification of exhaust gases produced by internal combustion engines.

Depending on the selection of catalyst composition, a catalyst product can be obtained that is only oxidizing, or only reducing or a sequentially oxidizing and reducing or concurrently oxidizing and reducing exhaust gas purification system. Oxidation catalysts contain as the active phase preferably platinum and palladium, reduction catalysts preferably platinum and rhodium, the two-bed systems a platinum- and rhodium-containing initial catalyst and a platinum, platinum/palladium-, platinum/rhodium-, or platinum/palladium/rhodium-containing second catalyst; multifunctional catalysts contain preferably platinum/rhodium or platinum/palladium/rhodium.

All active phases indicated, however, contain cerium in the amount indicated as taught by the invention, which can be added at the same time as the platinum group metals to the catalyst.

DETAILED DESCRIPTION OF INVENTION

The invention will now be described in greater detail by the following illustrative embodiments.

COMPARISON EXAMPLE 1

A ceramic honeycomb body made of cordierite with 62 cells/cm$^2$ was coated with 160 g/l of carrier volume of an oxide mixture. For this purpose, an aqueous suspension with a solids content of 52 weight % and the following composition was used for the oxide mixture present after activation:

74.9 parts by weight gamma-Al$_2$O$_3$ with a specific surface of 142 m$^2$/g 21.8 parts by weight CeO$_2$ employed as ammonium-cerium (IV) nitrate [Ce(NO$_3$)$_6$](NH$_4$)$_2$ 1.9 parts by weight zirconium dioxide employed basic zirconium carbonate 1.4 parts by weight Fe$_2$O$_3$ employed as iron nitrate Fe(NO$_3$)$_3$.9H$_2$O.

After coating of the carrier body with the oxide layer, the resulting body was dried at 120° C. and then activated by heating at 350° C. for 15 minutes and for another 2 hours at 700° C.

The thusly coated carrier body was then submerged in an aqueous solution of hexachloroplatinic acid and rhodium chloride in a 5:1 ratio by weight and dried. The total noble metal content was 0.70 g/L of carrier volume after this treatment. After a 2-hour tempering at 550° C. in air, the reduction of the noble metal salt deposited on the carrier material finally occurred in a hydrogen stream at a temperature of 550° C. for the period of 4 hours.

EXAMPLE 1

A ceramic honeycomb body was coated with the same oxide layer and in the same manner as described in Comparison Example 1, dried, and activated. The method for the application of the noble metal to the coated carrier also corresponded in essential detail to the procedure in Comparison Example 1. In contrast to Comparison Example 1, however, the aqueous noble metal impregnation solution contained cerium(III) nitrate in addition to hexachloroplatinic acid and rhodium chloride The total noble metal con-tent after impregnation of the coated carrier was 0.70 g/L of carrier volume at a noble metal ratio of Pt:Rh of 5:1.

The amount of CeO$_2$ applied in addition by this impregnation was 0.007 g/L of carrier.

EXAMPLE 2

The preparation of this catalyst proceeded as in Example 1. However, the amount of cerium oxide applied in addition by the Pt/Rh/Ce impregnation in this case was 0.07 g/L of carrier volume.

EXAMPLE 3

The preparation of this catalyst proceeded as in Example 1. The amount of cerium oxide applied in addition by the Pt/Rh/Ce impregnation in this case was 0.35 g/L of carrier volume.

EXAMPLE 4

The preparation of this catalyst proceeded as in Example 1. However, the amount of cerium oxide applied in addition by the Pt/Rh/Ce impregnation was 7×10$^{-4}$ g/L of carrier volume.

EXAMPLE 5

The preparation of this catalyst proceeded as in Example 1. The amount of cerium oxide applied in addition by the Pt/Rh/Ce impregnation was 35×10$^{-4}$ g/L of carrier volume.

EXAMPLE 6

A ceramic honeycomb body (62 cells/cm$^2$) was coated with washcoat, dried and activated in the same manner as described in Comparison Example 1 The oxide layer had the following composition:

61.4 parts by weight gamma-aluminum oxide 36.8 parts by weight cerium oxide as cerium(III) acetate 1.8 parts by weight zirconium oxide, as zirconium (IV) acetate.

The application of the noble metals platinum and rhodium onto the carrier also proceeded according to the procedure given in Comparison Example 1. The noble metal impregnation solution, however, contained cerium (III) nitrate in addition. The total noble metal content of the finished catalyst was 0.70 g/L of carrier volume at a noble metal content of Pt:Rh of 5:1. The amount of CeO$_2$ applied in addition by the Pt/Rh/Ce impregnation was 0.014 g/L of carrier volume.

COMPARISON EXAMPLE 2

A honeycomb body (62 cells/cm$^2$) was coated with the same oxide layer and in the same manner as described in Example 6, dried, and activated. The application of the noble metal to the coated layer proceeded in essential detail according to the procedure in Example 6. Platinum was used in the form of hexachloroplatinic acid and palladium in the form of palladium(II) chloride.

Cerium salt was not added to the noble metal impregnation solution The total noble metal content of the finished catalyst was 0.70 g/L of carrier volume at a noble metal ratio of Pt:Pd of 3:1.

EXAMPLE 7

The preparation of the catalyst proceeded as in Comparison Example 2 with the difference that cerium nitrate Ce(NO$_3$)$_3$ was added to the noble metal impregnation solution. The amount of CeO$_2$ thus applied was 0.014 g/L of carrier volume.

COMPARISON EXAMPLE 3

A ceramic honeycomb body (62 cells/cm$^2$) was coated with washcoat in the same manner as described in comparison Example 1, dried, and activated The oxide layer had the following composition:

69.1 parts by weight gamma-aluminum oxide 28.8 parts by weight cerium oxide as cerium(III) nitrate.

2.1 parts by weight zirconium oxide as zirconyl nitrate.

The application of the noble metal platinum also proceeded according to the method given in Comparison Example 1. Hexachloroplatinic acid served as the platinum component. The total noble metal content of the finished catalyst was 0.70 g/L of carrier volume.

EXAMPLE 8

The preparation of this catalyst proceeded as in Comparison Example 2 with the difference that cerium(III) nitrate was added to the noble metal impregnation solution. The amount of $CeO_2$ thus applied was $7 \times 10^{-4}$ g/L of carrier volume.

EXAMPLE 9

The preparation of this catalyst proceeded as in Example 8 with the difference that rhodium(III) chloride was used instead of hexachloroplatinic acid. The total noble metal content of the finished catalyst was also 0.70 g/L of carrier volume. However, the amount of cerium oxide applied in addition with the rhodium impregnation solution in this case was 0.014 g/L of carrier volume.

EXAMPLE 10

The preparation of this catalyst proceeded as in Example 8 with the difference that rhodium(III) chloride was used in addition to hexachloroplatinic acid. The total noble metal content of the finished catalyst was 0.70 g/L of carrier volume at a noble metal reaction of Pt:Rh of 5:1. The amount of cerium oxide applied in addition with the noble metal impregnation solution was 0.021 g/L of carrier volume.

EXAMPLE 11

The preparation of this catalyst proceeded as in Example 8. The difference was that rhodium(III) chloride and palladium(II) chloride were used in addition to hexachloroplatinic acid. The total noble metal content of the finished catalyst was 0.70 g/L at a noble metal ratio of Pt:Pd:Rh of 2:3:1. The amount of cerium oxide applied in addition with the noble metal impregnation solution was 0.007 g/L of carrier volume.

COMPARISON EXAMPLE 4

A ceramic honeycomb body (62 cells/cm$^2$) was coated with washcoat in the same manner as described in Comparison Example 1, dried, and activated. The oxide layer had the following composition:
54.6 parts by weight gamma-aluminum oxide
32.8 parts by weight cerium oxide as cerium(III) nitrate
11.0 parts by weight NiO
1.6 parts by weight zirconium oxide as zirconyl nitrate.

The deposition of the noble metals onto the coated honeycomb body proceeded in all essential details according to the method in Comparison Example 1, with the difference that the noble metal impregnation solution contained palladium(II) chloride in addition. The total noble metal content of the finished catalyst was 0.70 g/L of carrier volume at a noble metal ratio by weight of Pt:Pd:Rh of 1.8 : 2.5 : 1.

EXAMPLE 12

The preparation of this catalyst proceeded as in Comparison Example 4 with the difference that cerium(III) nitrate was added to the noble metal impregnation solution. The amount of $CeO_2$ thus applied was 0.07 g/L of carrier volume.

Testing of the Catalysts

The catalysts prepared according to the preparation examples given above were tested relative to their properties in the conversion of the exhaust gas pollutants, carbon monoxide, hydrocarbons, and nitrogen oxide, in a test unit that operated on a synthetic gas mixture, analogous to that on an internal combustion engine. The dimensions of the test catalysts were usually cylindrical (diameter $\times$ height $= 1'' \times 3''$). The space velocity was 50,000 h-1. Propane was used as an example as the hydrocarbon component.

| Composition of the Synthetic Exhaust Gas for lambda = 1.01 (lean) | |
|---|---|
| Components | Volume |
| $N_2$ | 72.55 |
| $CO_2$ | 14.00 |
| $H_2O$ | 10.00 |
| $O_2$ | 1.42 |
| $CO_2$ | 1.40 |
| $H_2$ | 0.47 |
| NO | 0.10 |
| $C_3H_8$ | 0.06 |

The gas mixture for the simulation of a rich exhaust gas (lambda = 0.98) differs from the above mentioned composition only in that the proportion of oxygen was selected as correspondingly lower and the proportion of nitrogen as correspondingly higher.

The conversion of the pollutants, CO, HC, and NO, was determined under equilibrium conditions at an exhaust gas temperature of 450° C. To characterize the cold-start behavior of the catalyst, the temperature of the exhaust gas was raised linearly from 75° C. to 450° C. at a heating rate of 15° C./min. n so doing, the pollutant conversion was recorded concurrently. The temperatures at which conversion rates of 50% or 90% were achieved were designated with the subscript 50 or 90 for the sake of brevity These indices serve as a measure of the readiness of the catalyst to begin converting the respective pollutant component.

All catalysts were always tested after a 24-hour aging in air at 950° C.

The results obtained with the corresponding above-mentioned examples in the static conversion test are presented in the following Tables.

TABLE 1

| | Equilibrium Conversion [%] | | | | | |
|---|---|---|---|---|---|---|
| | $\lambda = 0.98$ (rich) | | | $\lambda = 1.01$ (lean) | | |
| Catalyst | CO | HC | NOx | CO | HC | NOx |
| Comp. Ex. 1 | 84 | 10 | 99 | 99 | 40 | 12 |
| Example 1 | 85 | 10 | 99 | 99 | 94 | 35 |
| Example 2 | 83 | 8 | 99 | 99 | 95 | 31 |
| Example 3 | 84 | 9 | 99 | 99 | 94 | 30 |
| Example 4 | 82 | 8 | 99 | 99 | 96 | 31 |
| Example 5 | 84 | 9 | 99 | 99 | 97 | 29 |
| Example 6 | 88 | 51 | 99 | 99 | 89 | 24 |
| Comp. Ex. 2 | 77 | 79 | 95 | 99 | 75 | 15 |
| Example 7 | 82 | 84 | 99 | 99 | 87 | 20 |
| Comp. Ex. 3 | 75 | 28 | 82 | 99 | 78 | 19 |
| Example 8 | 81 | 52 | 91 | 100 | 96 | 34 |
| Example 9 | 96 | 94 | 100 | 99 | 89 | 27 |
| Example 10 | 97 | 80 | 100 | 100 | 94 | 38 |
| Example 11 | 86 | 92 | 99 | 99 | 84 | 40 |
| Comp. Ex. 4 | 74 | 71 | 99 | 99 | 44 | 7 |
| Example 12 | 73 | 89 | 99 | 99 | 70 | 28 |

The conversion values show a significant increase particularly for the lean operation for the pollutants hydrocarbons and nitrogen oxides when using a catalyst made by employing a cerium-containing noble metal impregnation solution.

TABLE 2

Light-off performance with Rich Mixtures
(T = 75° C.→450° C., rate = 15° C./min, lambda = 0.98)

| | Light-off Temperature/°C. | | | | | |
|---|---|---|---|---|---|---|
| | $CO_{50}$ | $CO_{90}$ | $HC_{50}$ | $HC_{90}$ | $NOx_{50}$ | $NOx_{90}$ |
| Comp. Ex. 1 | 267 | 283 | — | — | 263 | 276 |
| Example 1 | 273 | 287 | 371 | — | 272 | 285 |
| Example 2 | 267 | 281 | 353 | — | 267 | 280 |
| Example 3 | 267 | 281 | 330 | — | 268 | 280 |
| Example 4 | 264 | 276 | — | — | 261 | 284 |
| Example 5 | 259 | 279 | — | — | 254 | 283 |
| Example 6 | 194 | 219 | 309 | — | 200 | 217 |
| Comp. Ex. 2 | 193 | 239 | 323 | 398 | 201 | 216 |
| Example 7 | 189 | 220 | 315 | 379 | 194 | 206 |
| Comp. Ex. 3 | 259 | — | — | — | 298 | — |
| Example 8 | 256 | 442 | 368 | — | 295 | 308 |
| Example 9 | 260 | 278 | 305 | 363 | 262 | 278 |
| Example 10 | 199 | 223 | 357 | — | 204 | 218 |
| Example 11 | 232 | — | 314 | 391 | 233 | 251 |
| Comp. Ex. 4 | 232 | — | 321 | — | 247 | 265 |
| Example 12 | 229 | — | 302 | 358 | 239 | 260 |

TABLE 3

Light-off performance with Rich Mixtures
(T = 75° C.→450° C., rate = 15° C./min, lambda = 1.01)

| | Light-off Temperature/°C. | | | | | |
|---|---|---|---|---|---|---|
| | $CO_{50}$ | $CO_{90}$ | $HC_{50}$ | $HC_{90}$ | $NOx_{50}$ | $NOx_{90}$ |
| Comp. Ex. 1 | 274 | 289 | 450 | — | 273 | — |
| Example 1 | 270 | 285 | 294 | 414 | 281 | — |
| Example 2 | 265 | 277 | 288 | 398 | 280 | — |
| Example 3 | 259 | 272 | 282 | 393 | 283 | — |
| Example 4 | 263 | 277 | 339 | 410 | 286 | — |
| Example 5 | 265 | 278 | 334 | 406 | 282 | — |
| Example 6 | 255 | 265 | 300 | — | 277 | — |
| Comp. Ex. 2 | 188 | 200 | 350 | — | — | — |
| Example 7 | 185 | 194 | 326 | 450 | — | — |
| Comp. Ex. 3 | 261 | 309 | 313 | 388 | — | — |
| Example 8 | 258 | 303 | 297 | 368 | 289 | — |
| Example 9 | 260 | 278 | 300 | 373 | 281 | — |
| Example 10 | 197 | 212 | 298 | 362 | 293 | — |
| Example 11 | 213 | 227 | 302 | 376 | 286 | — |
| Comp. Ex. 4 | 216 | 227 | 365 | — | — | — |
| Example 12 | 213 | 229 | 338 | — | 284 | — |

The light-off performance according to Tables 2 and 3 barely changes for the pollutants CO and NOx, but improves with HC. This applies equally to rich and lean exhaust gas compositions.

Further modifications and variations of the foregoing will become apparent to those skilled in the art and are intended to be encompassed by the claims appended hereto.

German priority application P 38 03 122.1-41 is relied on and incorporated herein.

We claim:

1. A method of making a catalyst for the purification of exhaust gases from internal combustion engines comprising forming a support by impregnating aluminum oxide from the transition series with an aqueous solution of a cerium salt and a zirconium salt and optionally an iron salt and/or a nickel salt, or impregnating with an aqueous suspension of oxides, hydroxides, or carbonates of cerium, zirconium, and optionally iron and/or nickel; tempering the support by heating in air at a temperature from 500 to 900°, impregnating the support with an aqueous solution of a salt or a noble metal and a base metal wherein the noble metal is platinum, palladium or rhodium or mixtures thereof and the base metal is cerium, the amount of noble metal component being from 0.03 to 3 weight percent and the amount of cerium being 0.01 to 150% by weight based on the total weight of the noble metal and cerium in the form of cerium oxide being an amount from 0.0007 to 0.35 gram per liter of carrier volume, contacting the so impregnated support with a hydrogen gas stream at a temperature from 250 to 650° C. and thereby forming the carrier catalyst.

2. A catalyst for purifying exhaust gases from internal combustion engines comprising a support composed of aluminum oxide from the transition series, which contains 5 to 70 weight % $CeO_2$ and 1.6 to 1.9 weight % $ZrO_2$, 1 to 10 weight % $Fe_2O_3$, and 0 to 20 weight % $NiO_2$, and a catalytically active phase deposited on the support, said phase consisting of 0.03 to 3 weight % of a noble metal selected from the group of platinum, palladium and rhodium or mixtures thereof, in combination with a base metal, cerium, the amount of cerium being 0.01 to 150% by weight, based on the total weight of noble metal and cerium in the form of cerium oxide being an amount from 0.0007 to 0.35 gram per liter of carrier volume; said catalyst produced by the method of claim 1.

3. The catalyst according to claim 2 wherein the weight ratio of platinum and/or palladium to the rhodium is 2:1 to 20:1.

4. The catalyst according to claim 2 which is produced by impregnating the support with an aqueous solution comprising a cerium and zirconium salt.

5. The catalyst according to claim 4 wherein the solution also contains an iron salt or a nickel salt, or mixture thereof.

6. The catalyst according to claim 2 wherein the support is mixed with an aqueous suspension of the oxides or hydroxides or carbonates of cerium, zirconium, iron and nickel.

7. The catalyst according to claim 4 wherein the support after impregnation is tempered in air by heating to 500 to 900° C.

8. The catalyst according to claim 4 wherein after impregnating, an additional impregnating of the support is done with an aqueous solution of a salt of the noble metal and the base metal and then drying.

9. The catalyst according to claim 2 wherein the support is treated in a hydrogen-containing gas stream at temperatures from 250 to 650° C.

10. The catalyst according to claim 2 deposited on a honeycomb ceramic substrate.

11. The catalyst according to claim 2 deposited on a honeycomb metal substrate.

12. The catalyst according to claim 2 wherein the catalytically active phase is present in an amount of 5 to 30% by weight based on the support.

13. The catalyst according to claim 2 wherein the support is lattice-stabilized alumina.

14. The method according to claim 13 wherein the support is deposited on a honeycomb shaped carrier of ceramic or metal.

15. A catalyst produced by the method of claim 14.

16. The method of claim 13 wherein said impregnated support is contacted with a hydrogen gas stream at a temperature from 250 to 650° C. for 4 hours.

17. A catalyst of improved light off behavior for purifying exhaust gases from internal combustion engines comprising a support composed of aluminum oxide from the transition series, which contains 5 to 70 weight % $CeO_2$ and 1.6 to 1.9 weight % $ZrO_2$, 0 to 10 weight % $Fe_2O_3$, and 0 to 20 weight % $NiO_2$, and a catalytically active phase deposited on the support, said phase consisting of 0.03 to 3 weight % of a noble metal selected from the group of platinum, palladium and rhodium or mixtures thereof, in combination with a base metal, cerium, the amount of cerium being 0.01 to 150% by weight, based on the total weight of noble metal; said catalyst produced by the method of claim 1.

18. A method of improving the lean activity of catalysts for purifying exhaust gases from internal combustion engines, said method comprises contacting the catalyst of claim 2 with said exhaust gases for conversion of pollutants.

* * * * *